United States Patent
Park et al.

(10) Patent No.: US 10,348,397 B2
(45) Date of Patent: Jul. 9, 2019

(54) METHOD AND APPARATUS FOR MEASURING CHANNEL IN WIRELESS COMMUNICATION SYSTEM

(71) Applicant: LG ELECTRONICS INC., Seoul (KR)

(72) Inventors: Hanjun Park, Seoul (KR); Yunjung Yi, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 15/516,373

(22) PCT Filed: Oct. 6, 2015

(86) PCT No.: PCT/KR2015/010557
§ 371 (c)(1),
(2) Date: Mar. 31, 2017

(87) PCT Pub. No.: WO2016/056824
PCT Pub. Date: Apr. 14, 2016

(65) Prior Publication Data
US 2017/0310384 A1    Oct. 26, 2017

Related U.S. Application Data

(60) Provisional application No. 62/161,227, filed on May 13, 2015, provisional application No. 62/060,011, filed on Oct. 6, 2014.

(51) Int. Cl.
*H04B 7/26* (2006.01)
*H04L 1/00* (2006.01)
(Continued)

(52) U.S. Cl.
CPC ............. *H04B 7/26* (2013.01); *H04L 1/0023* (2013.01); *H04L 5/0053* (2013.01);
(Continued)

(58) Field of Classification Search
CPC ......... H04B 7/26; H04B 17/00; H04L 1/0023; H04L 5/0053; H04L 5/0073;
(Continued)

(56) References Cited

U.S. PATENT DOCUMENTS

2009/0154588 A1* 6/2009 Chen ................... H04L 1/0026
375/267
2011/0188393 A1* 8/2011 Mallik ................. H04B 7/024
370/252
(Continued)

FOREIGN PATENT DOCUMENTS

KR    1020140006304    1/2014
KR    1020140071480    6/2014
(Continued)

OTHER PUBLICATIONS

PCT International Application No. PCT/KR2015/010557, Written Opinion of the International Searching Authority dated Jan. 27, 2016, 21 pages.

*Primary Examiner* — Kashif Siddiqui
(74) *Attorney, Agent, or Firm* — Lee, Hong, Degerman, Kang & Waimey

(57) ABSTRACT

A method for performing channel measurement for one or more subbands belonging to the entire system bandwidth, which is performed by a terminal, may comprise the steps of: receiving, from a base station, information on a window of channel measurement sections for N subbands for which the channel measurement is performed and information indicating a sub-frame in which channel measurement is to be performed in the window; performing channel measure-
(Continued)

ment for K (N≥K) subbands in the window; and transmitting a result of the channel measurement to the base station, wherein the result of the channel measurement is transmitted to the base station in one subband belonging to the entire system bandwidth.

16 Claims, 8 Drawing Sheets

(51) Int. Cl.
  *H04L 5/00* (2006.01)
  *H04L 5/14* (2006.01)
  *H04W 28/02* (2009.01)
  *H04W 72/04* (2009.01)
  *H04W 72/08* (2009.01)
  *H04W 72/12* (2009.01)

(52) U.S. Cl.
  CPC .......... *H04L 5/0057* (2013.01); *H04L 5/0073* (2013.01); *H04L 5/0091* (2013.01); *H04W 72/0413* (2013.01); *H04L 5/001* (2013.01); *H04L 5/0005* (2013.01); *H04L 5/0051* (2013.01); *H04L 5/14* (2013.01); *H04L 5/1469* (2013.01); *H04W 28/0231* (2013.01); *H04W 72/08* (2013.01); *H04W 72/085* (2013.01); *H04W 72/1226* (2013.01); *H04W 72/1231* (2013.01)

(58) Field of Classification Search
  CPC ....... H04L 5/0091; H04L 5/14; H04L 5/1469; H04L 5/0005; H04L 5/001; H04L 5/0051; H04L 5/0057; H04W 28/0231; H04W 72/0413; H04W 72/08; H04W 72/085; H04W 72/1226; H04W 72/1231
  See application file for complete search history.

(56) References Cited

U.S. PATENT DOCUMENTS

| | | | |
|---|---|---|---|
| 2011/0222525 A1* | 9/2011 | Kishigami | H04J 11/005 370/343 |
| 2012/0093012 A1* | 4/2012 | Pedersen | H04B 7/0626 370/252 |
| 2013/0044624 A1* | 2/2013 | Su | H04L 1/0026 370/252 |
| 2013/0083753 A1* | 4/2013 | Lee | H04W 74/0833 370/329 |
| 2013/0308572 A1 | 11/2013 | Sayana et al. | |

FOREIGN PATENT DOCUMENTS

| | | |
|---|---|---|
| WO | 2013012213 | 1/2013 |
| WO | 2013115571 | 8/2013 |

* cited by examiner

METHOD AND APPARATUS FOR MEASURING CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2015/010557, filed on Oct. 6, 2015, which claims the benefit of U.S. Provisional Application Nos. 62/060,011, filed on Oct. 6, 2014 and 62/161,227, filed on May 13, 2015, the contents of which are all hereby incorporated by reference herein in their entirety.

TECHNICAL FIELD

The present invention relates to a wireless communication system, and more particularly, to a method of performing channel measurement between subbands.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

A technical task of the present invention is to perform channel measurement in a wireless communication system, and more particularly, to a method of performing channel measurement in a subband belonging to the entire system bandwidth and a method of reporting a result of the channel measurement.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing channel measurement, which is performed by a terminal on one or more subbands belonging to the entire system bandwidth in a wireless communication system, includes receiving information on a window of a channel measurement section for N subbands corresponding to a target of the channel measurement and information indicating a subframe in which channel measurement is to be performed within the window from a base station, performing channel measurement on K (N≥K) subbands within the window, and transmitting a result of the channel measurement to the base station. In this case, the result of the channel measurement may be transmitted to the base station on one subband belonging to the entire system bandwidth.

Additionally or alternately, the result of the channel measurement may be transmitted to the base station via a single CSI report.

Additionally or alternately, the information indicating the subframe in which the channel measurement is to be performed within the window may include channel measurement subframe group information consisting of specific number of subframes in which the channel measurement is to be performed and specific number of subframes in which frequency retuning for subband hopping is to be performed.

Additionally or alternately, if the information indicating the subframe in which the channel measurement is to be performed within the window is received, the terminal may determine that the base station does not transmit any DL data in the indicated subframe. If the information indicating the subframe in which the channel measurement is to be performed within the window is not received, the terminal may determine that the base station does not transmit any DL data in the whole of the window.

Additionally or alternately, the method may further include receiving information on the N subbands corresponding to the target of the channel measurement.

Additionally or alternately, the information on the N subbands may include an M-bit field indicating one of $2^M$ sets each of which consists of the N subbands.

Additionally or alternately, the method can further include receiving information on L subbands corresponding to a target of the channel measurement. In this case, the information on the L subbands can include L frequency domain offset values for a subband on which the terminal is currently operating.

Additionally or alternately, the method may further include transmitting information on the K subbands on which the channel measurement is performed.

Additionally or alternately, the method may further include receiving indexes of all subbands belonging to the entire system bandwidth and information on frequency resources corresponding to the indexes.

Additionally or alternately, the performing the channel measurement may include performing subband hopping on the K subbands and performing channel measurement on a corresponding subband and a time section for which the subband hopping is performed can be designated in advance.

To further achieve these and other advantages and in accordance with the purpose of the present invention, as embodied and broadly described, according to a different embodiment, a terminal configured to perform channel measurement on one or more subbands belonging to the entire system bandwidth in a wireless communication system includes an RF (radio frequency) unit and a processor configured to control the RF unit, the processor configured to receive information on a window of a channel measurement section for N subbands corresponding to a target of the channel measurement and information indicating a subframe in which channel measurement is to be performed within the window from a base station, perform channel measurement on K (N≥K) subbands within the window, transmit a result of the channel measurement to the base station. In this case, the result of the channel measurement can be transmitted to the base station on one subband belonging to the entire system bandwidth.

Additionally or alternately, the result of the channel measurement may be transmitted to the base station via a single CSI report.

Additionally or alternately, the information indicating the subframe in which the channel measurement is to be performed within the window may include channel measurement subframe group information consisting of specific number of subframes in which the channel measurement is to be performed and specific number of subframes in which frequency retuning for subband hopping is to be performed.

Additionally or alternately, if the information indicating the subframe in which the channel measurement is to be performed within the window is received, the processor may determine that the base station does not transmit any downlink (DL) data in the indicated subframe. If the information indicating the subframe in which the channel measurement is to be performed within the window is not received, the processor may determine that the base station does not transmit any DL data in the whole of the window.

Additionally or alternately, the processor may be configured to receive information on the N subbands corresponding to the target of the channel measurement.

Additionally or alternately, the information on the N subbands may include an M-bit field indicating one of $2^M$ sets each of which consists of the N subbands.

Additionally or alternately, the processor may be configured to receive information on L subbands corresponding to a target of the channel measurement and the information on the L subbands may include L frequency domain offset values for a subband on which the terminal is currently operating.

Additionally or alternately, the processor may be configured to transmit information on the K subbands on which the channel measurement is performed.

Additionally or alternately, the processor may be configured to receive, from the base station, indexes of all subbands belonging to the entire system bandwidth and information on frequency resources corresponding to the indexes.

Additionally or alternately, the processor may be configured to perform subband hopping on the K subbands and perform channel measurement on a corresponding subband and a time section for which the subband hopping is performed may be designated in advance.

It is to be understood that both the foregoing general description and the following detailed description are exemplary and explanatory and are intended to provide further explanation of the invention as claimed.

Advantageous Effects

According to one embodiment of the present invention, it is able to efficiently perform channel measurement in a subband belonging to the entire system bandwidth and report a result of the channel measurement.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
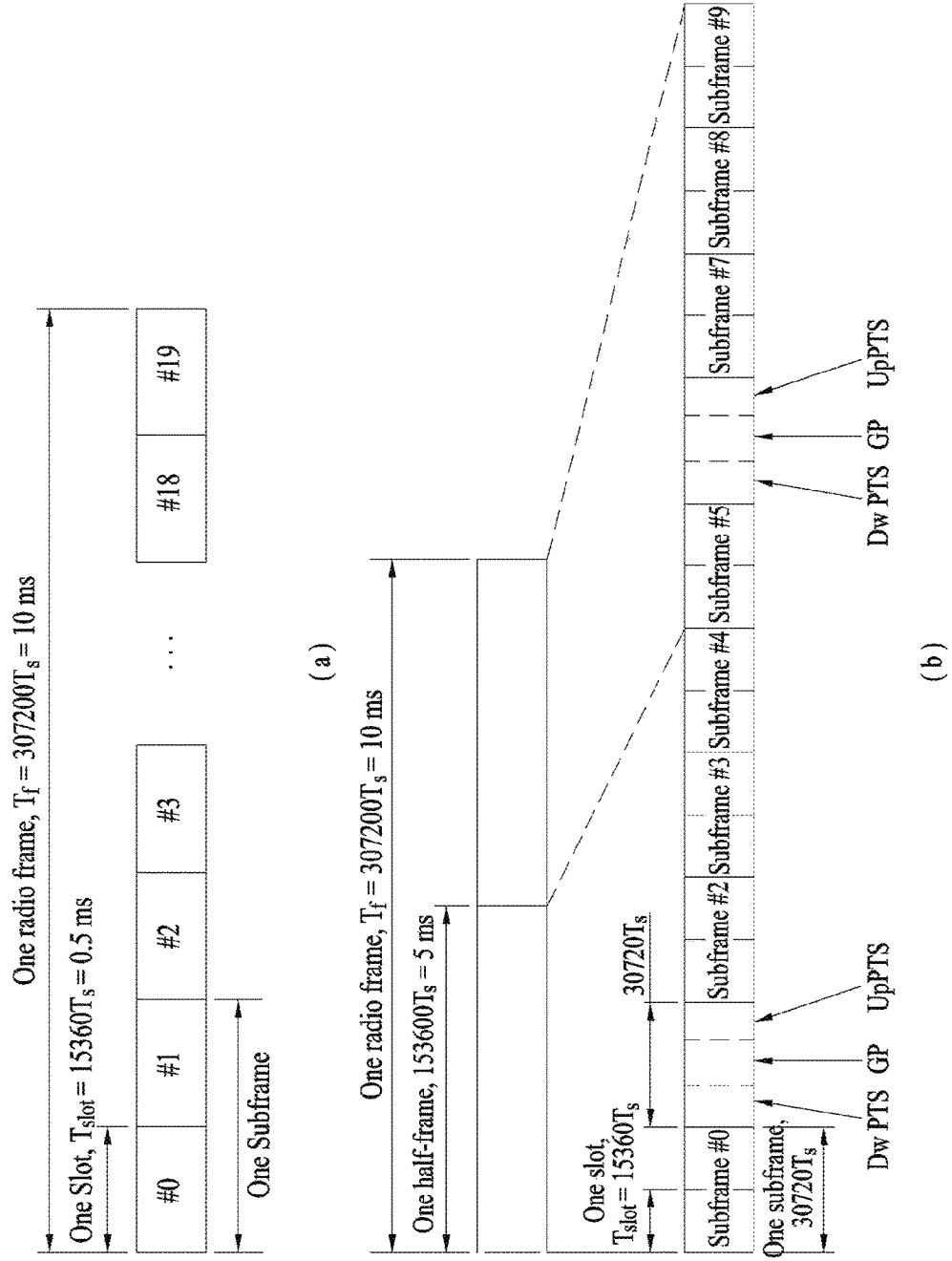
FIG. 1 is a diagram for an example of a radio frame structure used for a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
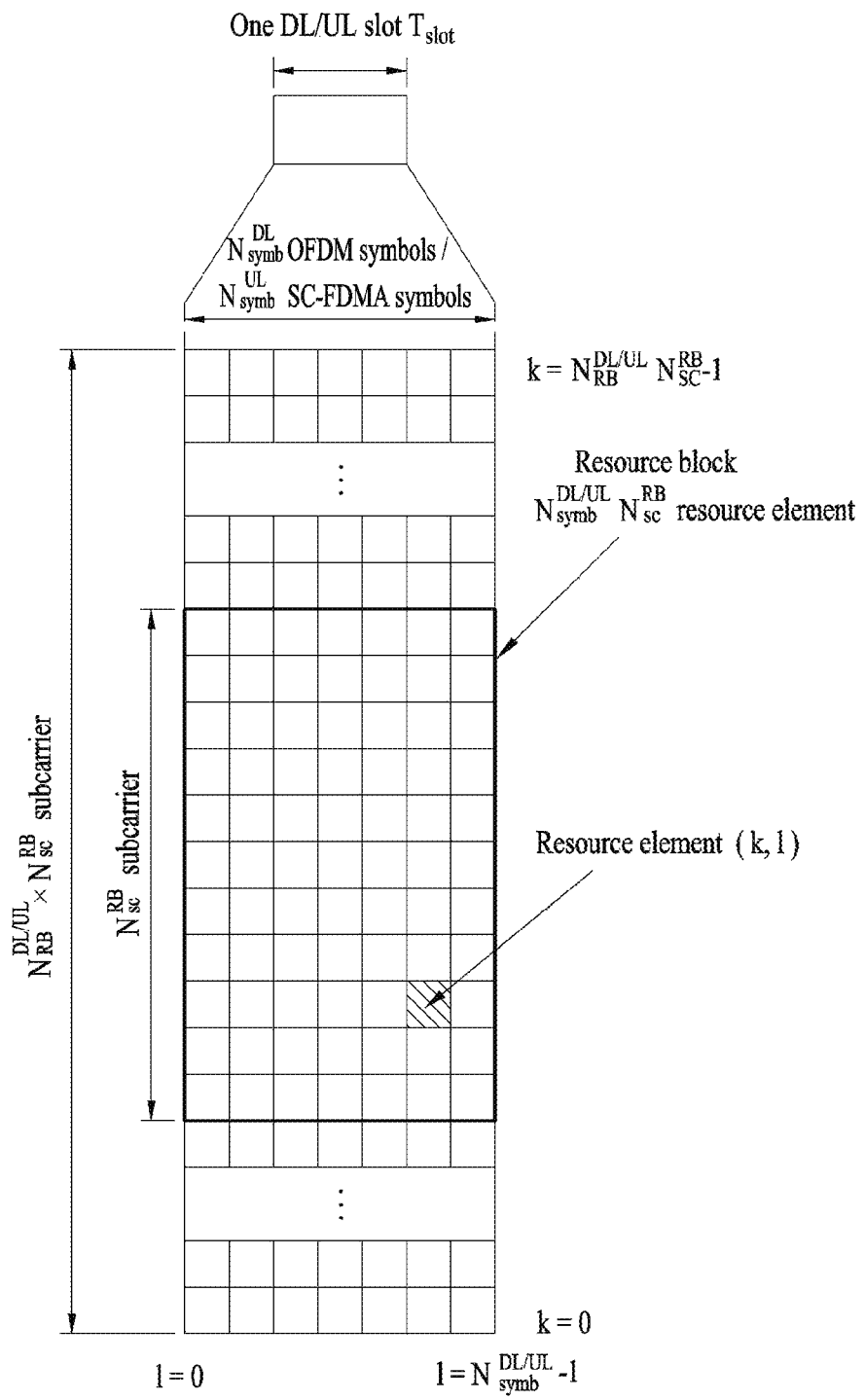
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{UL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
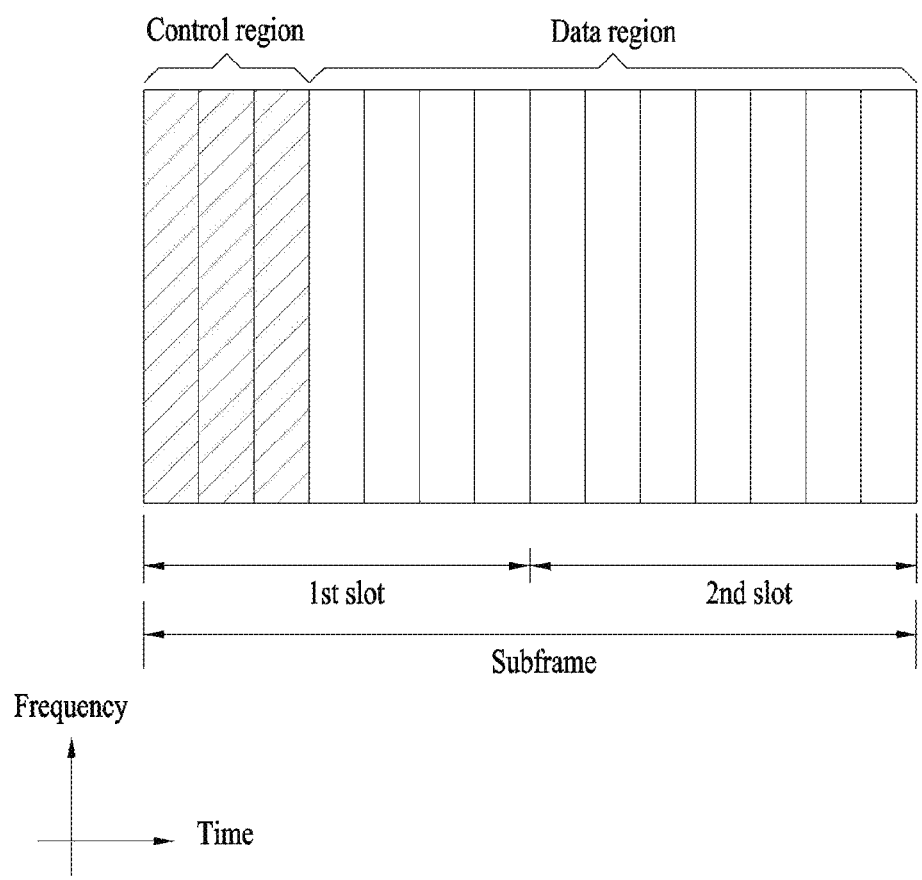
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |

TABLE 3-continued

| Search Space | | | Number of PDCCH |
|---|---|---|---|
| Type | Aggregation Level L | Size [in CCEs] | candidates $M^{(L)}$ |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
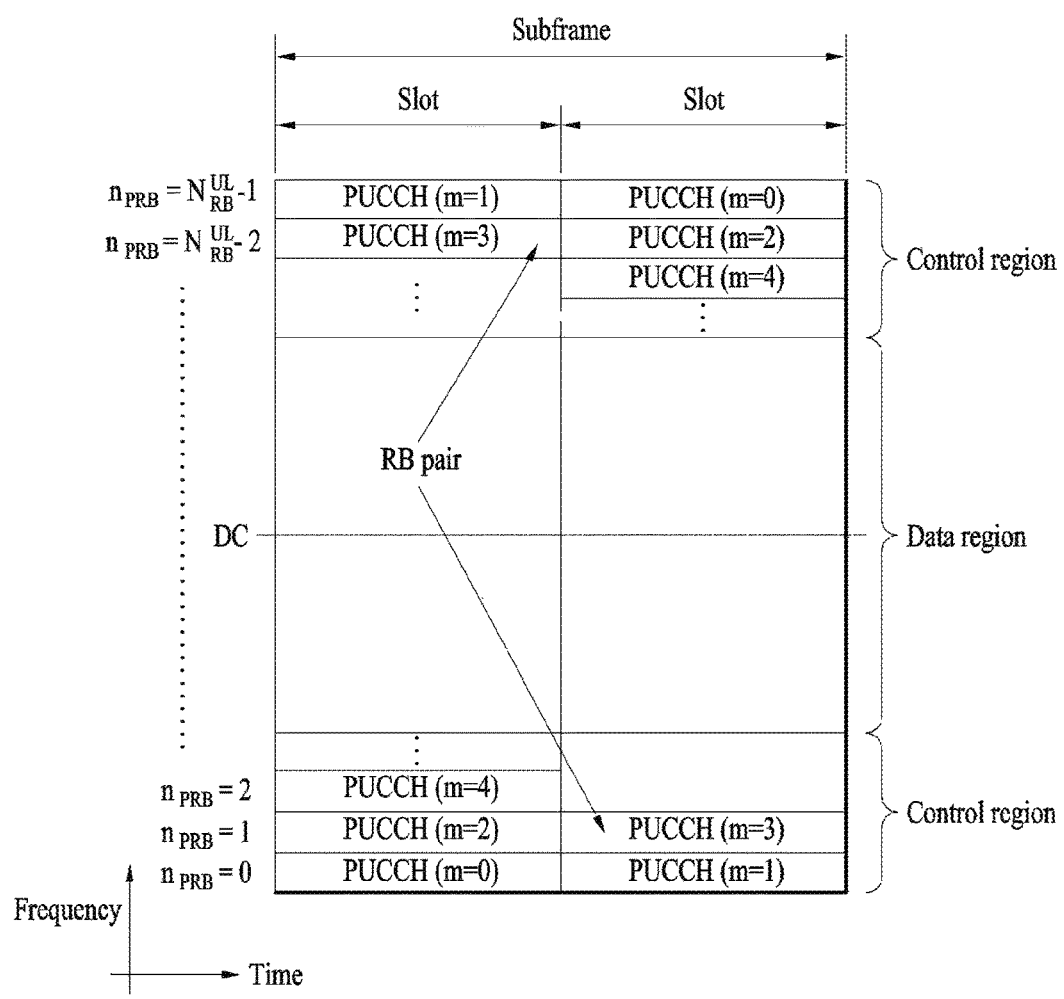
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

As a next system of the LTE-A, it may consider introducing a low-cost/low-specification terminal mainly performing data communication such as reading a meter, measuring a water level, utilizing a surveillance camera, reporting inventory of a vending machine, etc. For clarity, the terminal is commonly referred to as an MTC (Machine Type Communication) UE. In case of the MTC UE, transmitted data amount is less and uplink/downlink data transmission and reception occurs from time to time. Hence, it may be efficient to lower a price of the UE and reduce battery consumption in accordance with the low data transfer rate. In particular, if a frequency bandwidth on which the MTC UE operates is configured to be narrow, it may be able to considerably reduce RF/baseband complexity of the MTC UE. By doing so, it may be able to reduce manufacturing cost and battery consumption of the MTC UE. Compared to a legacy UE, the MTC UE can operate on a relatively narrower frequency band.

For a case that the MTC UE operating on a relatively narrower band compared to a legacy UE intends to perform frequency hopping in a general base station, the present invention proposes a method of reporting CSI information in a different subband belonging to the entire system bandwidth. In the following, although operations of the present invention are explained on the basis of 3GPP LTE system for example, it is apparent that the present invention can be applied not only to an MTC UE but also to general small BW (bandwidth) UEs.

(1) Subband Indexing

Figure 5:
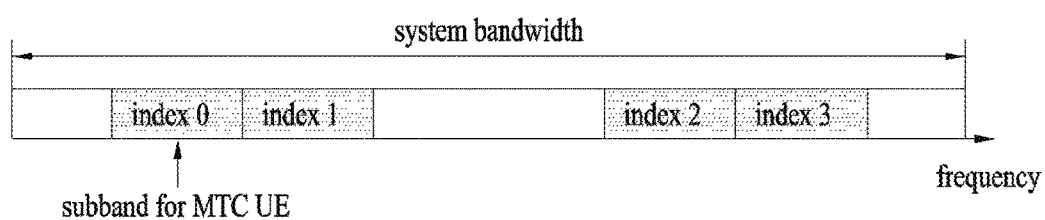
FIG. 5 is a diagram for a subband capable of being used by an MTC terminaland an index of the subband belonging to the entire system bandwidth.

The present invention proposes a method for a base station to configure subbands capable of being transmitted and received by a bandwidth reduced MTC UE in a system bandwidth of the base station and to inform the MTC UE of information on the subbands including an index of each subband and resource information per index. In LTE Rel-13 system, it is highly probable that the MTC UE and normal UEs co-exit. Hence, it may follow the right of a manager managing the base station to determine a frequency resource to be allocated to the MTC UE among the entire system bandwidth. Hence, when the base station configures the subbands capable of being transmitted and received by the MTC UE and informs the MTC UE of the information on the subbands, it may be preferable to inform the MTC UE of the information on the subbands including an index of each subband and resource information per index to more easily indicate a subband on which CSI measurement is to be performed. In particular, after the subbands are initially configured, the base station can inform the MTC UE of a specific physical resource position through a subband index. FIG. 5 shows a subband index for an MTC UE designated within a system bandwidth.

(2) Inter-frequency CSI Measurement Window

The present invention proposes a method that a base station sets an inter-frequency CSI measurement window to a bandwidth reduced MTC UE to perform CSI measurement on N ($\geq 1$) subbands and the MTC UE reports CSI on the N subbands within the inter-frequency CSI measurement window via single CSI report according to concrete embodiment of the present invention. More specifically, although measurement for N subbands is configured by the base station, if the UE is able to perform CSI measurement on the K subbands at the same time, it may provide a feedback for min (M, K) subband to the base station via the single CSI report. If all bandwidth reduced MTC UEs use a specific band only belonging to the system bandwidth of the base station, such a problem as a deficiency in data transmission resource, loss of frequency diversity gain, performance degradation due to interference, etc. may occur. Hence, it may be preferable to design the bandwidth reduced MTC UE to support frequency hopping to a different subband. And, in order to support the frequency hopping, it is preferable for the bandwidth reduced MTC UE to report CSI information on other subbands rather than a subband on which a transmission/reception operation is currently performed to the base station. In this case, the bandwidth reduced MTC UE is unable to perform CSI measurement on a plurality of subbands at the same time due to frequency retuning according to RF constraint. Similar to a legacy operation, if CSI reporting is performed whenever CSI measurement is performed, since CSI report information is less than UL resource, it is inefficient.

Therefore, the present invention proposes a method that the base station sets an inter-frequency CSI measurement window corresponding to a length of a measurement section in which CSI measurement is performed on N subbands to the bandwidth reduced MTC UE in a subframe unit (e.g., L subframes) and the MTC UE reports a plurality of CSIs corresponding to the measurement section to the base station via single CSI report.

In addition, when frequency retuning of a UE is considered, it may assume that the number of subbands capable of being measured in L subframes corresponds to floor (L/2). Or, when measurement using a CSI-RS is assumed, if it is able to assume that the frequency retuning is always performed in a single slot, it may perform measurement on the L subbands under an assumption that a CSI-RS transmitted to a UE is always received in a first or a second slot. This may indicate that it is not necessary to separately perform interference measurement according to a subband. In other word, it may assume that interference measured for each subband can be averaged. If it is necessary to differently measure interference according to a subband, since measurement for the interference is not sufficient, it may be necessary to average measurements measured in inter-frequency CSI measurement window several times.

In order to reduce delay, the MTC UE can alternately perform reporting on one subband (or a prescribed number of subbands). The operation of alternately performing CSI reporting on one subband (or prescribed number of subbands) can be performed by a periodic CSI reporting scheme. Although the MTC UE performs an aperiodic CSI reporting scheme, the operation can be performed at a plurality of promised reporting timings after a single aperiodic CSI report is triggered or can be performed at a plurality of reporting timings corresponding to triggering of a plurality of aperiodic CSI reporting.

In addition to the operation, when the base station indicates the MTC UE to report on K (K$\leq$M) subbands among the total M subbands in consideration of CSI feedback latency, the base station can dynamically inform the MTC UE of a length of an inter-frequency CSI measurement window for reporting the K subbands via DCI or L1 signaling. In this case, while the MTC UE performs CSI reporting on the M subbands, the MTC UE only updates CSI value for the K subbands within the length of the inter-frequency CSI measurement window informed by the base station via the DCI or the L1 signaling. For the rest of values, the MTC UE may report a previous value as it is or report OOR (out of range).

Figure 6:
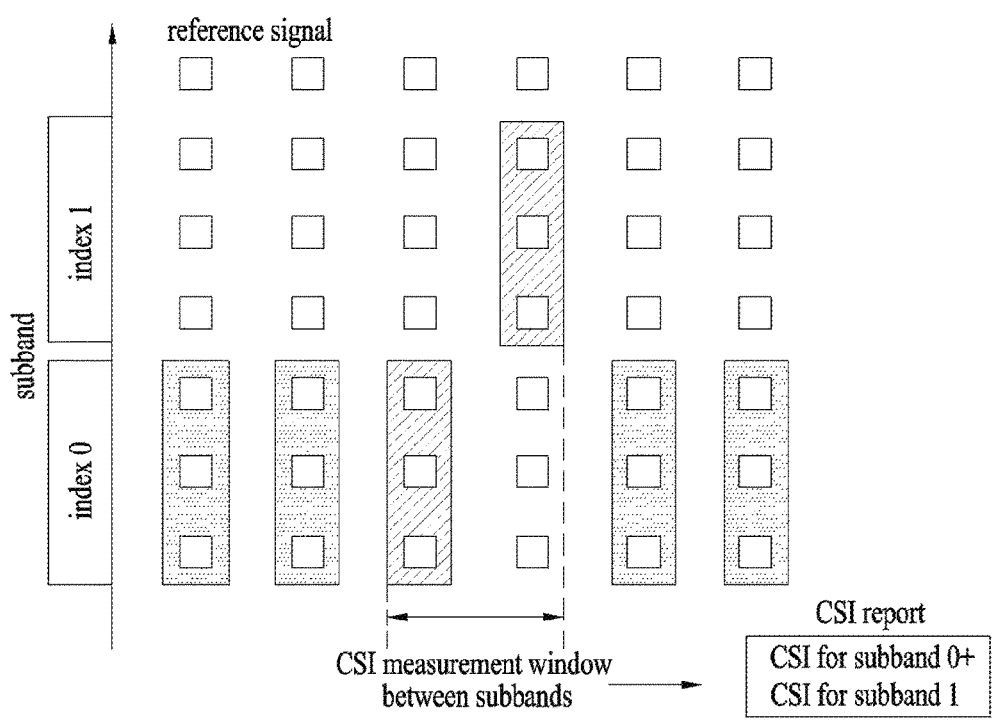
FIG. 6 is a diagram for a CSI measurement window between subbands according to one embodiment of the present invention.

In this case, the K subbands to be measured within the length of the inter-frequency CSI measurement window, which is informed by the base station via the DCI, may follow implementation of the UE. Or, the K subbands to be measured within the length of the inter-frequency CSI measurement window, which is informed by the base station via the DCI or the L1 signaling, can be determined by a scheme promised in advance between a network and the UE. For example, in case of performing aperiodic CSI reporting, whenever the aperiodic CSI reporting is triggered, the K subbands among the total M subbands can be alternately reported in a round robin form. For example, when M corresponds to 6 and K corresponds to 3, if a specific aperiodic CSI reporting is triggered for the M subbands having indexes of {0, 1, 2, 3, 4, 5}, the MTC UE reports CSI for the K subbands having indexes of 0, 1, and 2. If a next aperiodic CSI reporting is triggered, the MTC UE can report CSI for the K subbands having indexes of 3, 4, and 5. FIG. 6 shows an inter-frequency CSI measurement window and subband indexes to be reported.

(3) Inter-frequency CSI Measurement Occasion

When the base station sets an inter-frequency CSI measurement window to the bandwidth reduced MTC UE according to concrete embodiment of the present invention, the present invention additionally proposes a method of configuring a CSI measurement occasion becoming a timing of measuring CSI in the inter-frequency CSI measurement window by location information of a subframe in a corresponding section. When the base station intends to transmit data in the inter-frequency CSI measurement window, it is necessary for the base station to additionally inform the UE of information on a precise subframe in which inter-frequency CSI measurement is available. As an example, if the base station indicates a relative position of a subframe in the inter-frequency CSI measurement window to the MTC UE, the base station can inform the MTC UE of an inter-frequency CSI measurement occasion.

Or, a positon of an SF (subframe) in which an actual measurement operation is performed within the inter-frequency CSI measurement window can be determined in a form of a repetitive pattern. More specifically, a pattern is configured by $S_0$ measurement SFs and $S_1$ frequency retuning SFs and it is able to promise in advance between the base station and the MTC UE that the pattern is to be repeatedly applied. For example, an operation of performing CSI measurement for a subband in one SF and performing frequency retuning in a next SF can be repeated within the inter-frequency CSI measurement window.

In this case, if an inter-frequency CSI measurement occasion is configured, the MTC UE assumes that data transmission is not performed at the corresponding timing only. If the CSI measurement occasion is not configured, the MTC UE assumes that data transmission is not performed during the whole of the inter-frequency CSI measurement window.

Figure 7:
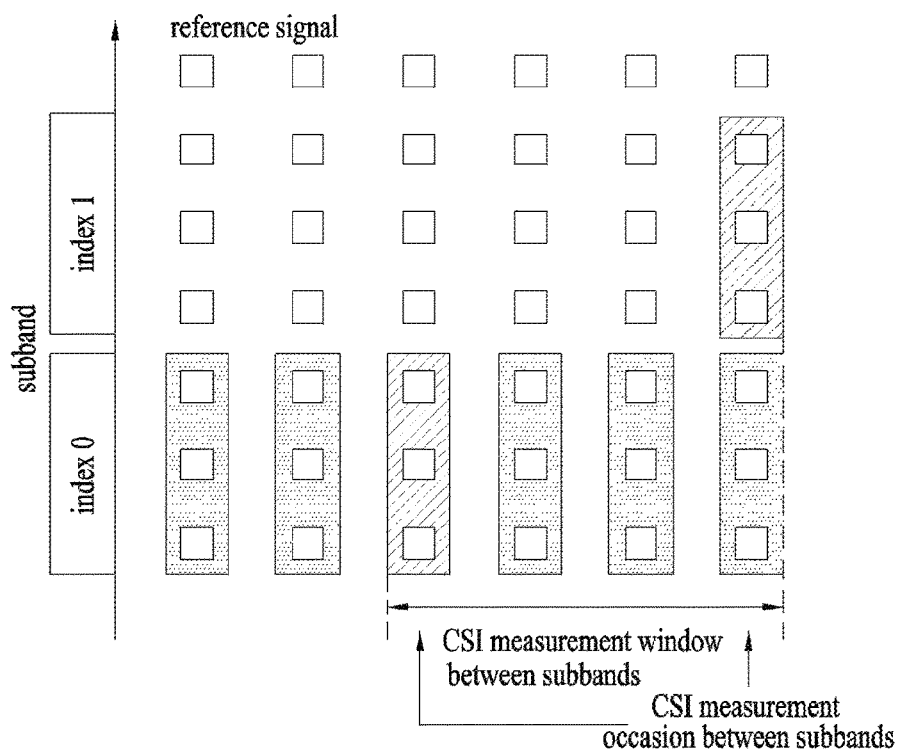
FIG. 7 is a diagram for a CSI measurement window between subbands and a CSI measurement occasion between subbands according to one embodiment of the present invention.

FIG. 7 shows an inter-frequency CSI measurement window and an inter-frequency CSI measurement occasion configured within the inter-frequency CSI measurement window.

(4) Timing for Inter-frequency CSI Measurement

When the base station sets periodic/aperiodic CSI feedback to the bandwidth reduced MTC UE according to concrete embodiment of the present invention and corresponding CSI reporting is performed in an $n^{th}$ UL subframe, the present invention proposes a method of performing inter-frequency CSI measurement under an assumption that an inter-frequency CSI measurement window starts at n-k-$L^{th}$ subframe. In this case, the k corresponds to a value in consideration of a reference signal, processing delay, and the like and the L corresponds to a length of the inter-frequency CSI measurement window. More specifically, the k can be defined as $n_{CQI,ref}$ in response to transmission modes 1 to 9.

In the time domain, for a UE configured in transmission mode 1-9 or transmission mode 10 with a single configured CSI process for the serving cell, the CSI reference resource is defined by a single downlink subframe n-$n_{CQI,ref}$, where for periodic CSI reporting $n_{CQI-ref}$ is the smallest value greater than or equal to 4, such that it corresponds to a valid downlink structure;

where for aperiodic CSI reporting nCQI_ref is such that the reference resource is in the same valid downlink subframe as the corresponding CSI request in an uplink DCI format.

where for aperiodic CSI reporting $n_{CQI-ref}$ is equal to 4 and downlink subframe n-$n_{CQI-ref}$ corresponds to a valid downlink subframe, where downlink subframe n-$n_{CQI-ref}$ is received after the subframe with the corresponding CSI request in a Random Access Response Grant.

Figure 8:
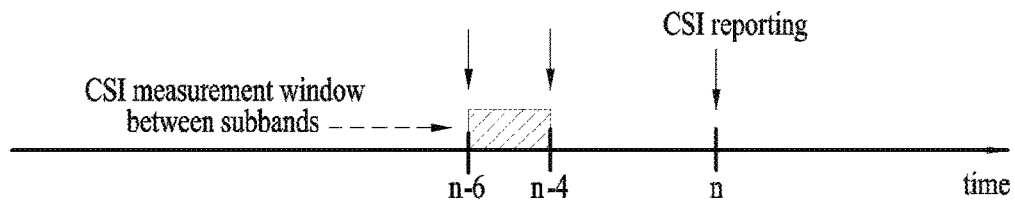
FIG. 8 is a diagram for a CSI measurement window between subbands and CSI reporting according to one embodiment of the present invention.

As an example, FIG. 8 shows an example that the k corresponds to 4 and the L corresponds to 2.

(5) Subband for Inter-frequency CSI Measurement (5.1) Periodic CSI Reporting

When the base station sets a periodic CSI reporting mode to the bandwidth reduced MTC UE according to concrete embodiment of the present invention, the present invention proposes a method for the base station to inform the MTC UE of a set of subband indexes for subbands corresponding to targets of the inter-frequency CSI measurement together with the CSI reporting mode. It is preferable that frequency hopping of the MTC UE is led by the base station which is aware of traffic information of the MTC UE. Hence, the base station determines a subband on which the inter-frequency CSI is to be measured and informs the MTC UE of the determined subband. In this case, if the base station sets the periodic CSI reporting mode to the UE, the base station can simply inform the UE of the set of indexes of the subbands corresponding to the targets of inter-frequency CSI measurement as well as the CSI reporting mode via higher layer signaling such as RRC or the like. The above-mentioned operation is valid when the aforementioned operation according to the subband index is assumed. If the operation according to the subband index is not guaranteed, the base station can directly inform the MTC UE of a frequency axis resource of the subbands corresponding to the measurement target.

When the MTC UE performs CSI reporting on a subband via the periodic CSI reporting, the MTC UE can transmit a CSI report on a plurality of subbands at the same time. This is because, when PUCCH corresponding to a feedback container for the periodic CSI reporting is repeatedly transmitted to extend coverage (coverage extension), if the MTC UE performs CSI reporting on a single subband via the PUCCH, as the count of repetitive transmission of the PUCCH increases, time delay for the base station to receive feedback on the total M subbands increases. In this case, the MTC UE can perform CSI reporting on the K subbands selected by the MTC UE at every periodic CSI reporting and the MTC UE can report information on a subband selected from among the M subbands to the base station together with the CSI report. As an example, when the M corresponds to 4 and the K corresponds to 1, the UE can report a subband on which CSI reporting is performed among the M subbands through additional 2 bits.

Figure 9:
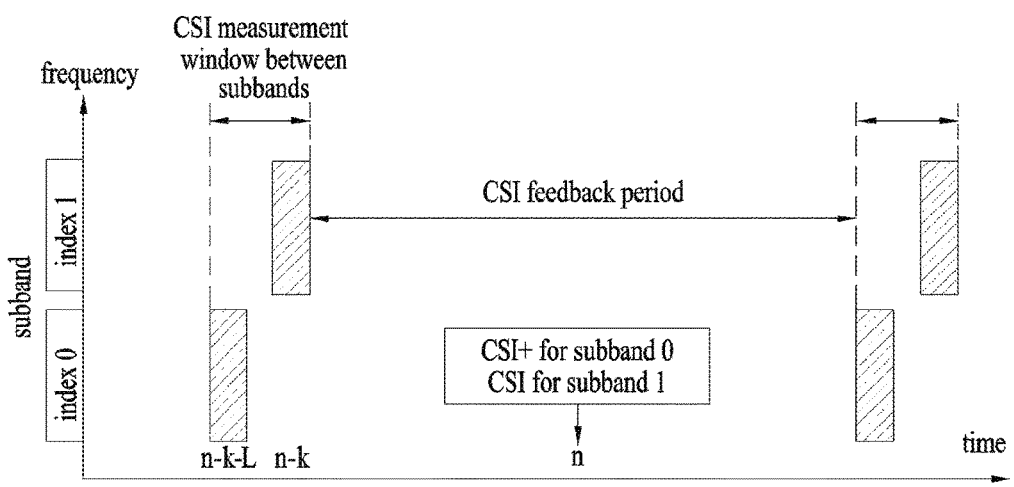
FIG. 9 is a diagram for a CSI measurement window between subbands and periodic CSI reporting according to one embodiment of the present invention.

FIG. 9 shows periodic inter-frequency CSI reporting.

(5.2) Aperiodic CSI Reporting (5.2.1) Pre-configured Subband Set

When the base station sets an aperiodic CSI reporting mode to the bandwidth reduced MTC UE according to concrete embodiment of the present invention, the present invention proposes a method for the base station to inform the MTC UE of information on $2^M$ sets including L subbands via higher layer signaling and indicate one of the $2^M$ sets of subbands, which are configured via higher layer signal in advance, as a target of inter-frequency CSI measurement through dynamic signaling including an M-bit field.

It is highly probable that the bandwidth reduced MTC UE corresponds to a UE existing at a relatively stationary location. Hence, periodic CSI reporting may not be efficient for the MTC UE. Yet, when traffic saturation for a specific subband, an interference problem, loss of frequency diversity gain of a channel, and the like are considered, it is still necessary to perform CSI feedback to support frequency hopping, In this case, it is preferable to have a structure of the aperiodic CSI feedback when the CSI feedback is performed. According to a legacy LTE Rel-12 system, DCI for indicating an UL grant includes a 2-bit bit field to trigger the aperiodic CSI feedback. As an example, each state of TMs 1 to 9 is shown in the following table.

TABLE 5

| Value of CSI request field | Description |
| --- | --- |
| '00' | No aperiodic CSI report is triggered |
| '01' | Aperiodic CSI report is triggered for serving cell $^c$ |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In the table above, a set including a plurality of CCs (component carriers) is set to a UE in advance in consideration of CA (carrier aggregation) scheme of LTE and an operation of triggering CSI reporting of a specific CC set via DCI (dynamic control information) is supported. Yet, it may rationally expect that the bandwidth reduced MTC UE does not have CA capability. Hence, the aperiodic CSI triggering can be utilized for the usage of indicating a set of subbands supporting the MTC UE rather than a set of CCs. For instance, as shown in table in the following, it may consider triggering of aperiodic CSI reporting for MTC UE.

TABLE 6

| Value of CSI request field | Description |
| --- | --- |
| '00' | No aperiodic CSI report is triggered |
| '01' | Aperiodic CSI report is triggered for currently operating MTC-subband |
| '10' | Aperiodic CSI report is triggered for 1$^{st}$ set of MTC-subbands configured by higher layers |
| '11' | Aperiodic CSI report is triggered for 2$^{nd}$ set of MTC-subbands configured by higher layers |

Figure 10:
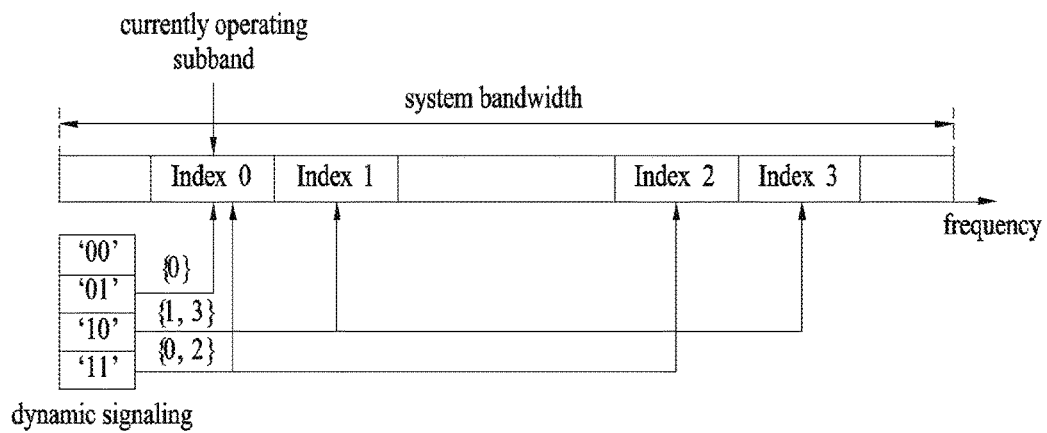
FIG. 10 is a diagram for a subband for measuring subband CSI via dynamic signaling according to one embodiment of the present invention.

In particular, '00' means that CSI reporting is not triggered. '01' means that CSI reporting is triggered for subband of the currently operating MTC UE. '10' and '11' mean that CSI reporting is triggered for a set of subbands independently configured via higher layer signal. FIG. 10 shows an example of triggering CSI reporting. If a CSI request field corresponds to '00', CSI reporting is not triggered. If the CSI request field corresponds to '01', CSI reporting is triggered in a subband (index) 0 on which the MTC UE is operating. If the CSI request field corresponds to '10', CSI reporting is triggered in subbands (indexes) 1 and 3 corresponding to the first set. If the CSI request field corresponds to '11', CSI reporting is triggered in subbands (indexes) 0 and 2 corresponding to the second set.

When the base station is able to inform the UE of a set of subbands to be measured via a bit field of an aperiodic CSI request, an inter-frequency CSI measurement window for measuring the set of subbands can be determined according to a size of the set, i.e., number of subbands included in the subband set. As an example, if the size of the subband set corresponds to K, the inter-frequency CSI measurement window can be determined as 2*K as a function having the size of the subband set as a factor.

(5.2.2) Set of Preconfigured Frequencies/Index Offsets

When the base station sets an aperiodic CSI reporting mode to the bandwidth reduced MTC UE according to concrete embodiment of the present invention, the present invention proposes a method for the base station to inform the MTC UE of information on $2^M$ sets including L subbands via higher layer signaling and indicate ① one of the $2^M$ sets of frequency offset values, or ② one of the $2^M$ sets of subband index offset values, which are configured via higher layer signal in advance, as a target of inter-frequency CSI measurement through dynamic signaling including an M-bit field.

When the aforementioned aperiodic CSI reporting is performed, if a subband on which the MTC UE is currently operating is not included in a set of subbands indicated by a trigger, it may be necessary to have an additional CSI reporting trigger for the currently operating subband. Since the CSI reporting is performed for frequency hopping, if the aperiodic CSI reporting has information on a set of a plurality of subbands, flexibility of the aperiodic CSI reporting can be enhanced. However, there is still restriction on the aperiodic CSI reporting. Hence, when the aperiodic CSI reporting is performed, the present invention proposes a method of indicating subbands corresponding to a target of inter-frequency CSI measurement by indicating offset values against a subband on which the MTC UE is currently operating via dynamic signaling. Specifically, the method can be represented as table in the following.

TABLE 7

| Value of CSI request field | Description |
| --- | --- |
| '00' | No aperiodic CSI report is triggered |
| '01' | Aperiodic CSI report is triggered for currently operating MTC-subband |
| '10' | Aperiodic CSI report is triggered for 1$^{st}$ set of frequency(or subband index) offsets configured by higher layers |
| '11' | Aperiodic CSI report is triggered for 2$^{nd}$ set of frequency(or subband index) offsets configured by higher layers |

(5.2.3) Reporting Mode

When the base station sets an aperiodic CSI reporting mode to the bandwidth reduced MTC UE according to concrete embodiment of the present invention, the present invention proposes a method of setting a limit on a reporting mode capable of being supported by the MTC UE by a mode 1-0 or a mode 1-1. Since the MTC UE has a narrow bandwidth, a subband-based CSI feedback is not efficient. Hence, it may be preferable to support the mode 1-0 (i.e., wideband CQI reporting, no PMI reporting) or the mode 1-1 (i.e., wideband CQI reporting, wideband PMI reporting) only in terms of complexity reduction.

(5.2.3) Reporting Timing

As mentioned in the foregoing description, if the last repetition of an aperiodic CSI request is received in a subframe n, it is necessary for the MTC UE to have an inter-subband CSI measurement gap as much as L subframes. In this case, it may indicate that the MTC UE is able to transmit a CSI report in a subframe n+L+k (In this case, k corresponds to UL PUSCH timing. If UL grant is received in the subframe n, PUSCH is transmitted in a subframe n+k.) However, this may indicate that a transmission timing of PUSCH can be differently processed depending on a case that there is an aperiodic CSI request and a case that there is no aperiodic CSI request. In this case, the MTC UE may assume that there is no transmission during the L subframes. Or, the inter-subband CSI measurement gap can be periodically configured. The MTC UE can perform measurement on a plurality of subbands in the periodically configured gap. When an aperiodic CSI request is set, the MTC UE can transmit a report on a corresponding subband set. In this case, a transmission timing of aperiodic CSI reporting may correspond to a subframe n+k. Or, it may be able to assume that the inter-subband CSI measurement gap is configured for periodic CSI and aperiodic CSI, respectively. In this case, a period, an offset, and duration of the two gaps may be different from each other. When the inter-subband CSI gap is differently configured, the MTC UE performs average measurement on interference and the like using the gap configured for the periodic CSI and performs signal measurement and the like using the gap configured for the aperiodic CSI. In this case, PUSCH can be transmitted in a subframe n+L+k.

(5.2.4) Container for CSI Reporting

When the base station sets an aperiodic CSI reporting mode to the bandwidth reduced MTC UE according to concrete embodiment of the present invention, the present invention proposes a method of utilizing PUCCH or segmented PUSCH configured by a resource unit equal to or less than a single RB to perform aperiodic CSI reporting. Although CSI for a plurality of subbands is transmitted via a single CSI report according to the operation of the present invention, if the number of subbands configured for the CSI report is not big, an amount of CSI report information to be transmitted can be considerably small compared to an UL resource. Hence, the present invention proposes a method of utilizing a more compact PUCCH container structure for the usage of aperiodic CSI reporting or a method of utilizing a resource unit of PUSCH for the usage of aperiodic CSI reporting by dividing the resource unit into ½ RB or the like.

(6) Reference Signal for Inter-frequency CSI Measurement.

(6.1) Burst CSI-RS

When the base station sets an inter-frequency CSI measurement window to the bandwidth reduced MTC UE according to the concrete embodiment of the present invention and the MTC UE supports TM 9/TM 10, the present invention proposes a burst CSI-RS that make a CSI-RS to be transmitted according to timing of inter-frequency CSI measurement occasion. When the MTC UE supports the TM9 or TM10, in order to support an operation based on the inter-frequency CSI measurement window of the present invention, it is necessary to transmit a CSI-RS corresponding to a reference signal for measuring CSI of the TM9 and the TM10 within the inter-frequency CSI measurement window. Hence, when the base station separately configures the inter-frequency CSI measurement occasion within the inter-frequency CSI measurement window, the present invention proposes to transmit a CSI-RS at the occasion only. If the base station does not separately configure the inter-frequency CSI measurement occasion within the inter-frequency CSI measurement window, the present invention proposes to transmit a CSI-RS in the whole of the inter-frequency CSI measurement window.

(6.2) Burst CSI-IM

When the base station sets an inter-frequency CSI measurement window to the bandwidth reduced MTC UE according to the concrete embodiment of the present invention and the MTC UE supports TM 10, the present invention proposes a burst CSI-IM that makes CSI-IM exist according to timing of inter-frequency CSI measurement occasion. Similar to the operation of the burst CSI-RS, when the MTC UE supports the TM10, in order to support an operation based on the inter-frequency CSI measurement window of the present invention, a CSI-IM resource for measuring interference should exist within the inter-frequency CSI measurement window. Hence, when the base station separately configures the inter-frequency CSI measurement occasion within the inter-frequency CSI measurement window, the present invention proposes to configure a CSI-IM at the occasion only. If the base station does not separately configure the inter-frequency CSI measurement occasion within the inter-frequency CSI measurement window, the present invention proposes to configure a CSI-IM in the whole of the inter-frequency CSI measurement window.

Figure 11:
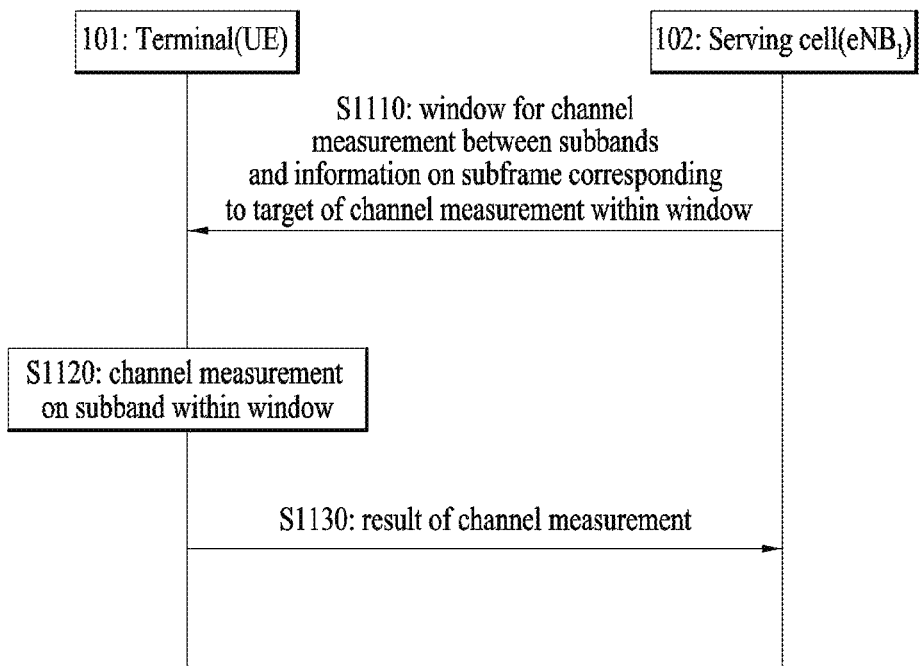
FIG. 11 is a flowchart for operations according to one embodiment of the present invention.

FIG. 11 is a flowchart for operations according to one embodiment of the present invention. FIG. 11 relates to a method of performing channel measurement on one or more subbands belonging to the entire system bandwidth in a wireless communication system.

A terminal 101 may receive information on a window of channel measurement section for N subbands corresponding to a target of the channel measurement and information on subframes on which the channel measurement is to be performed within the window from a base station [S1110]. The information on the subframes in which the channel measurement is to be performed within the window may include channel measurement subframe group information consisting of the specific number of subframes on which the channel measurement is to be performed and the specific number of subframes on which frequency retuning for subband hopping is to be performed. The channel measurement subframe group information may be configured to indicate a subframe which is repeated in the window to perform the channel measurement.

The terminal may receive information on N subbands corresponding to a target of the channel measurement from the base station. The information on the N subbands may include an M-bit field that indicates one of $2^M$ sets each of which consists of the N subbands.

The terminal may perform channel measurement on K (N≥K) subbands within the window [S1120]. The terminal may transmit a result of the channel measurement to the base station [S1130]. The result of the channel measurement may be transmitted to the base station from a subband belonging to the entire system band. And, the result of the channel measurement may be transmitted to the base station via a single CSI report.

Having received the information on the subframes in which the channel measurement is to be performed within the window, the terminal may determine that the base station does not transmit any downlink (DL) data in the indicated subframe. If the information indicating the subframe in which the channel measurement is to be performed within the window is not received, the UE may determine that the base station does not transmit any DL data in the whole of the window.

The terminal may receive information on L subbands corresponding to a target of the channel measurement. The information on the L subbands may be transmitted to the terminal in a manner of being added or replaced with the previously received information on the N subbands. The information on the L subbands may include L offset values of frequency domain for a subband on which the terminal is currently operating.

The terminal may transmit the information on the K subbands on which the channel measurement is performed.

Meanwhile, the terminal may receive information on indexes of all subbands belonging to the entire system bandwidth and frequency resources corresponding to the indexes.

Figure 12:
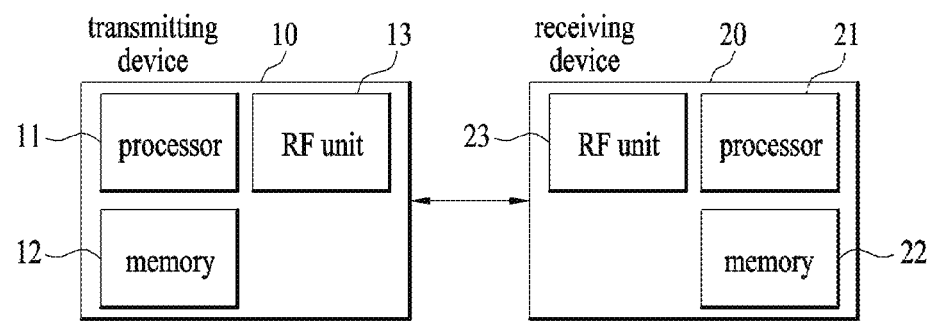
FIG. 12 is a block diagram of devices for implementing embodiment(s) of the present invention.

FIG. 12 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to a wireless communication device such as a mobile terminal, relay, or base station.

What is claimed is:

1. A method of performing a channel measurement on one or more subbands belonging to an entire system bandwidth in a wireless communication system, the method performed by a terminal and comprising:
    receiving information from a base station (BS), the information on a window of a channel measurement section for N subbands corresponding to a target of the channel measurement, information on a subframe in which the channel measurement is to be performed within the window and information on the N subbands;
    performing the channel measurement on K subbands within the window; and
    transmitting a result of the channel measurement to the BS on one of the one or more subbands,
    wherein the information on the N subbands includes an M-bit field indicating one of $2^M$ sets each of which comprises the N subbands, and
    wherein N≥K.

2. The method of claim 1, wherein the result of the channel measurement is transmitted via a single Channel State Indicator (CSI) report.

3. The method of claim 1, wherein the information on the subframe includes channel measurement subframe group information comprising a specific number of subframes in which the channel measurement is to be performed and a specific number of subframes in which frequency retuning for subband hopping is to be performed.

4. The method of claim 1, wherein the terminal determines that the BS does not transmit any downlink (DL) data in the subframe when the information on the subframe is received.

5. The method of claim 1, further comprising receiving information on L subbands on which the terminal is currently operating and corresponding to the target of the channel measurement, the information on the L subbands including L frequency domain offset values for the L subbands.

6. The method of claim 1, further comprising transmitting information on the K subbands.

7. The method of claim 1, further comprising receiving indexes of all subbands belonging to the entire system bandwidth and information on frequency resources corresponding to the indexes from the BS.

8. The method of claim 1, wherein:
    performing the channel measurement comprises performing subband hopping on the K subbands; and
    a time section for which the subband hopping is performed is predetermined.

9. A terminal configured to perform a channel measurement on one or more subbands belonging to the entire system bandwidth in a wireless communication system, the terminal comprising:
- a receiver and transmitter configured to receive and transmit information; and
- a processor, operatively coupled to the receiver and transmitter and configured to:
- control the receiver to receive information from a base station (BS), the information on a window of a channel measurement section for N subbands corresponding to a target of the channel measurement, information on a subframe in which the channel measurement is to be performed within the window and information on the N subbands;
- perform the channel measurement on K subbands within the window; and
- control the transmitter to transmit a result of the channel measurement to the BS on one of the one or more subbands,
- wherein the information on the N subbands includes an M-bit field indicating one of $2^M$ sets each of which comprises the N subbands, and
- wherein N≥K.

10. The terminal of claim 9, wherein the result of the channel measurement is transmitted via a single Channel State Indicator (CSI) report.

11. The terminal of claim 9, wherein the information on the subframe includes channel measurement subframe group information comprising a specific number of subframes in which the channel measurement is to be performed and a specific number of subframes in which frequency retuning for subband hopping is to be performed.

12. The terminal of claim 9, wherein the terminal determines that the BS does not transmit any downlink (DL) data in the subframe when the information on the subframe is received.

13. The terminal of claim 9, wherein the processor is further configured to control the receiver to receive information on L subbands on which the terminal is currently operating and corresponding to the target of the channel measurement, the information on the L subbands including L frequency domain offset values for the L subbands.

14. The terminal of claim 9, wherein the processor is further configured to control the transmitter to transmit information on the K subbands.

15. The terminal of claim 9, wherein the processor is further configured to control the receiver to receive indexes of all subbands belonging to the entire system bandwidth and information on frequency resources corresponding to the indexes from the BS.

16. The terminal of claim 9, wherein:
- performing the channel measurement comprises performing subband hopping on the K subbands; and
- a time section for which the subband hopping is performed is predetermined.

* * * * *